(12) United States Patent
Luo et al.

(10) Patent No.: US 11,811,956 B2
(45) Date of Patent: Nov. 7, 2023

(54) BLOCKCHAIN-BASED SUPERVISION SYSTEM OF HAZARDOUS CHEMICAL PRODUCTION

(71) Applicant: Hangzhou Vastchain Technology Co., Ltd, Hangzhou (CN)

(72) Inventors: Xiao Luo, Hangzhou (CN); Xiji Cheng, Hangzhou (CN); Jian Zhao, Hangzhou (CN); Zhiwen Zhang, Hangzhou (CN); Saiwei Song, Hangzhou (CN)

(73) Assignee: HANGZHOU VASTCHAIN TECHNOLOGY CO., LTD, Hangzhou (CN)

( * ) Notice: Subject to any disclaimer, the term of this patent is extended or adjusted under 35 U.S.C. 154(b) by 56 days.

(21) Appl. No.: 17/951,010

(22) Filed: Sep. 22, 2022

(65) Prior Publication Data

US 2023/0125955 A1 Apr. 27, 2023

(30) Foreign Application Priority Data

Oct. 26, 2021 (CN) .......................... 202111245384.X

(51) Int. Cl.
*H04L 9/00* (2022.01)
*H04L 9/08* (2006.01)
*G06F 21/73* (2013.01)
*G06F 21/53* (2013.01)

(52) U.S. Cl.
CPC .............. *H04L 9/50* (2022.05); *G06F 21/53* (2013.01); *G06F 21/73* (2013.01); *H04L 9/0869* (2013.01)

(58) Field of Classification Search
CPC ...... H04L 9/3236; H04L 9/321; H04L 9/3239; H04L 63/0876
USPC ............................................................ 726/4
See application file for complete search history.

(56) References Cited

U.S. PATENT DOCUMENTS

| 8,407,194 | B1 | 3/2013 | Chaput et al. | |
| 8,745,372 | B2* | 6/2014 | Orsini et al. | H04L 12/4641 713/168 |
| 9,264,224 | B2* | 2/2016 | O'Hare et al. | H04L 9/0861 |

(Continued)

FOREIGN PATENT DOCUMENTS

| CN | 109448197 A | 3/2019 |
| CN | 109729168 A | 5/2019 |

(Continued)

OTHER PUBLICATIONS

Jiang, Fengxiang, et al., "Blockchain Path of Block-chain Agriculture Under Background of Rural Revitalization Strategy," Guizhou Agricultural Sciences, Volume 49, pages 159-164.

*Primary Examiner* — Dant B Shaifer Harriman
(74) *Attorney, Agent, or Firm* — MUNCY, GEISSLER, OLDS & LOWE, P.C.

(57) ABSTRACT

A blockchain-based supervision system of hazardous chemical production includes: a collection layer, for collecting production data information, wherein a collection device in the collection layer sets a TEE to encrypt or hash the collected production data information; a data layer, for uplinking a hash certificate of the production data information through an alliance chain, wherein the collection layer communicates with the data layer; a blockchain, for deploying a file uplink contract and encrypting and storing a file on a privacy computing server after the file is connected to the trusted environment; and a privacy computing system, for forming a metadata market of the data from file description information, recording the metadata information of the collected data. A data user applies for the right of use to a production enterprise that produces the data, and after obtaining authorization, the data user performs various applications on the privacy computing system.

10 Claims, 1 Drawing Sheet

(56) References Cited

U.S. PATENT DOCUMENTS

| | | | | |
|---|---|---|---|---|
| 11,277,390 | B2* | 3/2022 | Verzun et al. | H04L 9/0662 |
| 11,388,003 | B2* | 7/2022 | Goodson | H02J 13/0004 |
| 2014/0298012 | A1* | 10/2014 | Orsini et al. | H04L 63/10 |
| | | | | 713/165 |
| 2019/0132350 | A1* | 5/2019 | Smith et al. | G06F 21/577 |
| 2019/0386969 | A1* | 12/2019 | Verzun et al. | G06F 21/606 |
| 2021/0105142 | A1* | 4/2021 | Lee et al. | H04L 9/3247 |
| 2021/0152352 | A1* | 5/2021 | Fan et al. | H04L 9/14 |
| 2022/0311607 | A1* | 9/2022 | Li et al. | H04L 9/0838 |
| 2022/0368682 | A1* | 11/2022 | Verzun et al. | H04L 9/50 |

FOREIGN PATENT DOCUMENTS

| | | | |
|---|---|---|---|
| CN | 110852595 | A | 2/2020 |
| CN | 111177253 | A | 5/2020 |
| CN | 111526200 | A | 8/2020 |
| CN | 112749232 | A | 5/2021 |
| CN | 113158248 | A | 7/2021 |
| CN | 113194469 | A | 7/2021 |
| CN | 113452517 | A | 9/2021 |

* cited by examiner

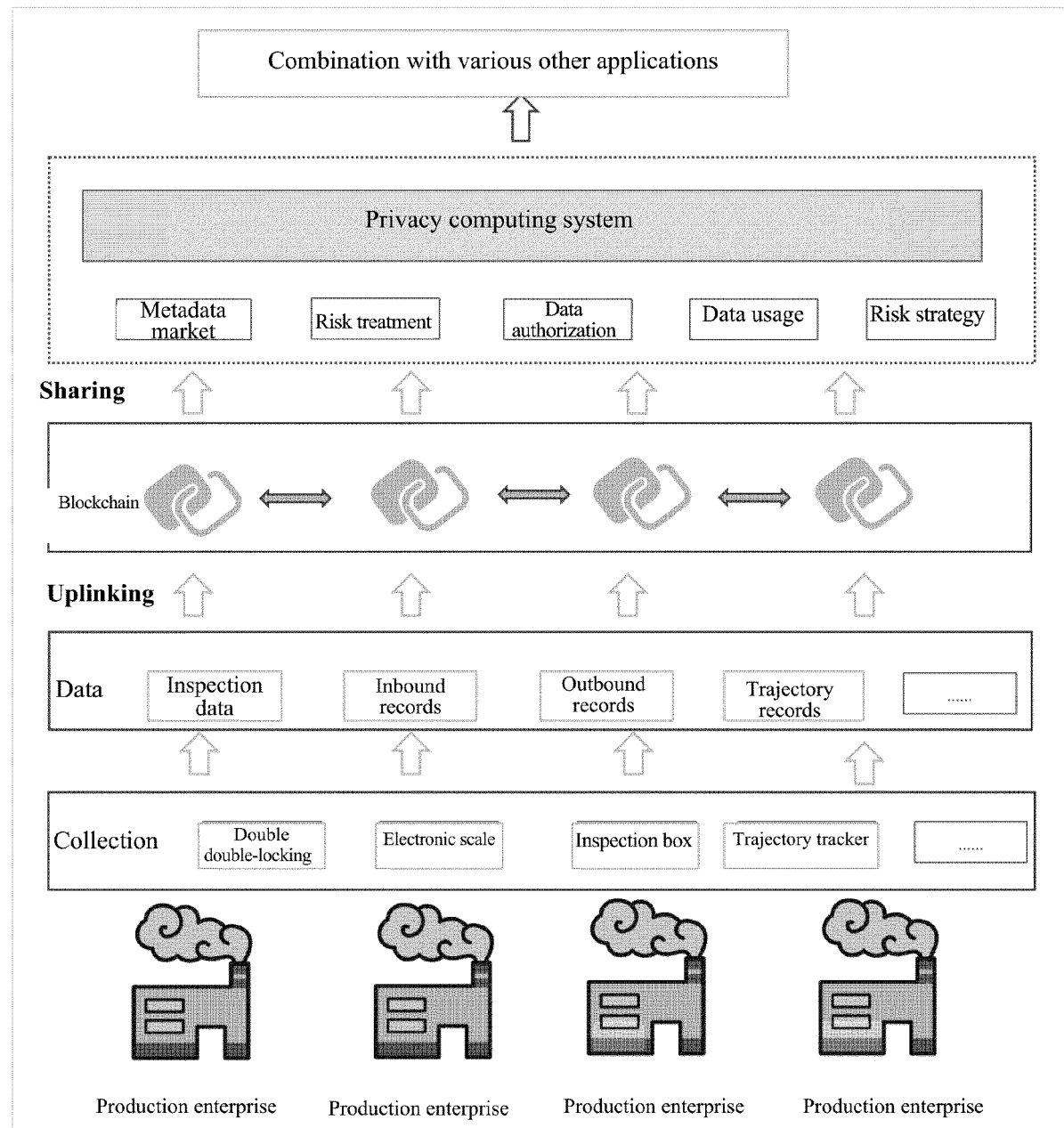

BLOCKCHAIN-BASED SUPERVISION SYSTEM OF HAZARDOUS CHEMICAL PRODUCTION

TECHNICAL FIELD

The present invention relates to privacy computing technology, in particular to a blockchain-based supervision system of hazardous chemical production.

BACKGROUND

A blockchain-based supervision system currently uses computer clients to synchronize data to a blockchain, which can ensure that the data is decentralized, open, transparent, and tamper-proof. In this way, the data does not have its own credibility before the data is uplinked. The data uplinked may be modified and adjusted manually by a system, and may be out of order in time or order.

At present, because there is no special blockchain chip and hardware, the authenticity and credibility of the data cannot be guaranteed before the data is uplinked, and it is difficult to realize one-time collection, permanent credible, and multi-party use of trusted data. For example, regulators and insurance companies have to repeatedly conduct due diligence, which wastes a lot of manpower and material resources. There is an urgent need for a reliable supervision system, which can make data collection credible, tamper-proof, permanently credible, and private and secure when used by multi-parties. The regulator does not worry about data tampering, and the user does not worry about data falsification, and one-time collection, permanent credibility, and multi-party use are finally achieved.

SUMMARY

The purpose of the present invention is to overcome the deficiencies of the prior art and provides a blockchain-based supervision system of hazardous chemical production.

In order to solve the above problems, the present invention adopts the following technical solutions:

A blockchain-based supervision system of hazardous chemical production, wherein the system comprises:
- a collection layer, configured for collecting production data information in a production process of a production enterprise, wherein a collection device in the collection layer sets a TEE (trusted execution environment) to encrypt or hash the collected production data information;
- a data layer, configured for uplinking a hash certificate of the production data information collected by the collection layer to a chain through an alliance chain, wherein the collection layer communicates with the data layer;
- a blockchain, configured for deploying a file uplink contract, and at the same time, encrypting and storing a file on a privacy computing server after the file is connected to the trusted environment;
- a privacy computing system, configured for forming a metadata market of the data from file description information uplinked, recording the metadata information of the collected data, wherein a data user applies for the right of use to a production enterprise that produces the data, and after obtaining authorization, the data user performs various applications on the privacy computing system;
- wherein the supervision system allocates different risk strategies according to a situation of each production enterprise, and carries out a corresponding risk treatment;

and wherein the communication between the collection layer and the data layer comprises the following steps:
- uniformly distributing a key for the collection device in the TEE is by a key management system of the data layer;
- binding a serial number of the collection device to a dispersion factor by the key management system, and dispersing the dispersion factor and a root key to obtain a device communication key of the collection device;
- performing two-way identity authentication before the collection device uploads the data to the data layer, wherein the collection device generates a first random number through TEE, sends the first random number and the serial number of the device to the data layer, and waits for the data layer to return an encryption result for authentication in the data layer;
- querying the key management system to obtain the corresponding dispersion factor after the first random number and serial number from the collection device are received by the data layer, utilizing the dispersion factor to disperse a root key to obtain a communication key of the collection device, and then utilizing the communication key to encrypt the received first random number so as to obtain a first encryption result, generating a second random number at the same time, and sending the first encryption result and the second random number to the collection device;
- after the first encryption result and the second random number are received by the collection device, firstly decrypting the first encryption result in the TEE, and comparing the first encryption result with the first random number, ending the authentication if the first encryption result is the same as the first random number, continuing to encrypt the second random number with the TEE so as to obtain a second encryption result if the first encryption result is not the same as the first random number, returning the second encryption result to the data layer, decrypting the second encryption result by the data layer with the previously generated device communication key, and comparing a decryption result with the second random number, and considering the device to be credible and accepting the data from the data collection device if the decryption result is the same as the second random number;
- during the operating process, forming a data packet with the collected data and the serial number of the device by the data collection device, encrypting the data packet with a key in the TEE to form a ciphertext data packet, and uploading the ciphertext data packet as well as plaintext information of the serial number of the device to the data layer;
- using the key management system by the data layer to disperse the received serial number with the corresponding dispersion factor to obtain the communication key, and using the key to decrypt the ciphertext data packet to verify whether the serial number therein is consistent, and displaying the data is in the data layer and then uploading the data to the blockchain through the data layer if the serial number therein is consistent.

In a possible design, the privacy computing system adopts the TEE (trusted execution environment) technology; the data user writes an execution logic used by the data through a scripting language, and encrypts the scripting language and sends the scripting language to the TEE; after the script is received by the TEE, decryption is performed on the script; and after the decryption, the TEE executes the script through a built-in script interpreter; and, after the script is executed, the data user obtains the execution result.

In a possible design, the production data collected by the collection device includes unlocking operation information.

In a possible design, the unlocking operation information is double double-locking operation information, and a warehouse door of a hazardous chemical production enterprise is set to have two people present at the same time, and only the warehouse door opens after the identity information of the two people is verified; and the data information of the device is to record who opens the door of the hazardous chemicals warehouse and the time when the door opens.

In a possible design, the production data collected by the collection device includes data information of an electronic scale.

In a possible design, the data information of the electronic scale includes: when items in the warehouse of the production enterprise are taken with the electronic scale used for weighing, the data information of the device is to record who takes the items, which items are taken, the weight of the items, and the time when the items are taken.

In a possible design, the production data collected by the collection device includes operation data of an inspection box.

In a possible design, the production data collected by the collection device includes data of a trajectory tracker.

In a possible design, if the item to be taken is a hazardous chemical, the data of the trajectory tracker is data recorded by the trajectory tracker after the item is taking, the data indicating a place where the item is taken to from the warehouse.

In a possible design, the production data collected by the collection device includes a temperature of hazardous chemicals, inflammables and explosives, and a surrounding temperature, so as to monitor an existing risk in real time, early warn and report the risks in a timely manner.

In a possible design, the collection device used to collect the temperature of the hazardous chemicals, inflammable and explosive materials and the surrounding temperature is an industrial infrared camera.

In a possible design, the production data collected by the collection device includes a hydraulic pressure of a storage pipe of the hazardous chemicals, and the value thereof and a changing trend are monitored in real time, so as to warn and report in a timely manner.

In a possible design, an industrial AI camera is used to obtain hydraulic barometer data of the storage tank of the hazardous chemicals by taking regular photos, and AI analysis is used to convert picture information into digital information.

In a possible design, the production data collected by the collection device includes infrared images of transportation pipelines in the hazardous chemical production enterprise, so as to analyze a damage or leakage problem in time, monitor operation status thereof in real time, and warn and report in a timely manner.

The beneficial effects of the present invention are:
(1) Using the blockchain-based supervision system of hazardous chemical production in the embodiment of the present invention, the user only needs to care about the conclusion of the metadata of the privacy computing system after various industry applications, and does not need to care about the authenticity of the metadata. Reliable data communication between the data layer and the collection layer ensures the reliability of data from the collection to the use, from pre-uplinking to being uplinked, so as to ensure the realization of trusted IoT (Internet of Things), which achieves one-time collection, multi-party use, and permanent credibility.
(2) By setting up the privacy computing system and the blockchain connection, and completing the processing of the data within the privacy data system, data leakage is avoided and the security of privacy data is protected;
(3) By collecting data such as the unlocking operation information, the data information of the electronic scale, the operation data of the inspection box, and the data of the trajectory tracker at the collection layer, the data standardization of hazardous chemicals can be realized, so that hazardous chemicals can be underwritten, and on the other hand, by tracking and checking the hazardous chemicals, the safety of the hazardous chemicals can also be directly improved; and
(4) By using the interpreter of the scripting language preset in the TEE on the privacy computing system, the script can be ensured to be passed to the trusted execution environment for direct execution, which avoids the risk of data leakage after the non-scripting language is passed to the server for compilation.

BRIEF DESCRIPTION OF DRAWINGS

The sole FIGURE is a schematic structural diagram of a blockchain-based supervision system for hazardous chemical production according to a first embodiment of the present invention.

DETAILED DESCRIPTION OF EMBODIMENTS

The embodiments of the present invention are described below through specific examples, and a person skilled in the art can easily understand other advantages and effects of the present invention from the contents disclosed in the specification. The present invention can also be implemented or applied through other different specific embodiments, and various details in this specification can also be modified or changed based on different viewpoints and applications without departing from the spirit of the present invention. It should be noted that the following embodiments and features in the embodiments may be combined with each other under the condition of no conflict.

It should be noted that the drawings provided in the following embodiments are only used to illustrate the basic concept of the present invention in a schematic way, so the drawings only show the components related to the present invention rather than the amount, shapes and sizes of components in an actual implementation. In the actual implementation, the type, quantity and ratio of each component can be changed at will, and the layout of the components may also be more complicated.

The sole FIGURE shows a blockchain-based supervision system of hazardous chemical production according to an embodiment of the present invention, wherein the system comprises: a collection layer, configured for collecting production data information in a production process of a production enterprise, wherein a collection device in the collection layer sets a TEE (Trusted Execution Environment) to encrypt or hash the collected production data information; a data layer, configured for uplinking a hash certificate of the production data information collected by the collection layer through an alliance chain, wherein the collection layer communicates with the data layer; and a privacy computing system, configured for forming a metadata market of the data from file description information uplinked, recording the metadata information of the collected data, wherein a data user applies for the right of use to a production enterprise that produces the data, and after obtaining authorization, the data user performs various applications on the privacy computing system. The supervision system allocates different risk strategies according to the situation of each production enterprise, and carries out corresponding risk treatment. The supervision system configures risk strategies and risk processing for different processes through the aggregated data as well as the actual situation of the production enterprise, so as to achieve the purpose of automatic early warning and automatic supervision.

In an embodiment of the present invention, the privacy computing system adopts the TEE (trusted execution environment) technology; the data user writes an execution logic used by the data through a scripting language, and encrypts the scripting language and sends the scripting language to the trusted execution environment; after the script is received by the TEE, decryption is performed on the script; and after the decryption, the TEE executes the script through a built-in script interpreter; and, after the script is executed, the data user obtains the execution result.

In an embodiment of the present invention, the collection device collects the production data information in the production process of the production enterprise as unlocking operation information. In addition, it collects data information of an electronic scale, operation data of an inspection box, and data of a trajectory tracker. The unlocking operation information indicates the entry and exit of the personnel. A face access control device which is connected to the Internet is used, and then a mode is set to a double double-locking mode. First, the personnel with unlocking authority are divided into two groups and entered into two permission groups of the double double-locking respectively. Double double-locking operation means that it needs one person for each of the two permission groups, and they are authenticated separately. The authentication method can be swiping a face, or swiping a card, inputting a fingerprint or password, etc. After the two staff members have passed the authentication, they can open a door lock and a safety factor of the hazardous chemical production and storage is improved. Therefore, in the unlocking operation information of this example, the information of two persons can be recorded each time. It should be noted that in some other implementations, single-locking or other locking methods can also be used. When it takes too long time to open the door which exceeds closing time specified by a risk strategy, a door closing time-out alarm is triggered. When the door is automatically opened without authorization, an intrusion alarm is triggered, and then according to risk treatment methods, processing methods such as a sound or light alarm, an SMS prompt, or mail copy is carried out.

In an embodiment of the present invention, the collection device collects the production data information in the production process of the production enterprise as data information of an electronic scale. The data information of the electronic scale is used to record the amount of hazardous chemicals taken. In the process of taking away the hazardous chemicals from a warehouse, the personnel need to use the electronic scale to weigh the hazardous chemicals firstly. The electronic scale is connected to the network in real-time as a data collection device. The data information of the electronic scale also includes personnel information, which is obtained from the unlocking operation information through the face access control device. The data information of the electronic scale directly shows who has taken away the hazardous chemicals from the warehouse and how much of the hazardous chemicals are taken away, which is convenient for overall planning and traceability of the hazardous chemicals. When the amount of the hazardous chemicals taken away exceeds a value configured by the risk strategy, an alarm is triggered.

In an embodiment of the present invention, the collection device collects the production data information in the production process of the production enterprise as operation data of an inspection box. The operation data of the inspection box includes image data during the inspection process. In this example, the image data is obtained by an AI automatic inspection robot or inspection personnel through identity authentication of a trusted device (a Bluetooth inspection box or a NFC inspection box) during the inspection process of the hazardous chemical storage warehouse. It can record information such as the type and corresponding quantity of the hazardous chemicals. When the relevant inspection data is not received within the time specified by the risk strategy, a prompt is launched, wherein the inspection personnel is prompted by a text message or phone, and the supervisor is notified at the same time. A processing mechanism in the risk processing is automatically triggered, such as notifying other on-duty personnel to perform an inspection tasks.

In an embodiment of the present invention, the collection device collects the production data information in the production process of the production enterprise as data of a trajectory tracker. The data of the trajectory tracker indicates trajectory information of the hazardous chemicals after they are taken away from the warehouse. In this example, a movement tracking device is set on a hazardous chemical transportation route of the hazardous chemical production enterprise, and the data layer registers an actual physical address of each movement tracking device. When the personnel take away the hazardous chemicals, their transportation devices carry the Bluetooth inspection box which emits identity beacons around. When the transportation device moves to the tracking device through a Yuchain set on the transportation route, the movement tracking device receives the beacon. At the same time, the movement tracking device uploads the beacon and time of the transportation device to the data layer. The data layer can calculate the movement trajectory of the transportation device through the time, the beacon and the physical address of the movement tracking device which reports the data to determine whether the trajectory is correct or not. Through the calculation of the transportation time, it can be judged whether the transportation process is overtime. If it is overtime, it is abnormal, and the data layer would issue an alarm. Through the data of the trajectory tracker, it is convenient to trace the hazardous chemicals, prevent or deal with the leakage of the dangerous chemicals in time, and improve the use safety of the hazardous chemicals after being taken away from the warehouse. When the transportation time exceeds the time specified by the risk strategy, some special accidents may occur in the procedure, and the system would immediately alarm to notify supervisors, who can check on site or consult by phone a reason for timeout, and ask if backup is required.

In an embodiment of the present invention, the production data collected by the collection device includes a temperature of hazardous chemicals, inflammables and explosives, and a surrounding temperature, so as to monitor an existing risk in real time, early warn and report the risks in a timely manner. An industrial infrared camera collects the production data information in the production process of the production enterprise through temperature identification technology of infrared imaging, including the temperature of the hazardous chemicals, inflammable and explosive materials and the surrounding temperature. Through the temperature identification technology of infrared imaging, the existing risks are monitored in real time. Through comparison of the real-time temperature and a threshold value configured by the risk strategy, the early warning is reported in time.

In an embodiment of the present invention, the production data collected by the collection device includes a hydraulic pressure of a storage pipe of the hazardous chemicals, and the value thereof and a changing trend are monitored in real time, so as to warn and report in a timely manner. An industrial AI camera is used to obtain hydraulic barometer data of a hazardous chemical storage tank by taking pictures regularly. AI analysis is used to convert the picture information into digital information, which is uploaded to the data layer in time. The data layer monitors its values and changing trends in real time. Its development law is judged through continuous numerical changes, and an early warning is given by the difference between the continuous numerical change and the continuous change configured in the risk strategy. When its value exceeds a preset normal data range, it would trigger a risk processing action in time, such as: page warning and timely reporting, notifying relevant supervisors through SMS, calling a fire alarm telephone.

In an embodiment of the present invention, the production data collected by the collection device includes infrared images of transportation pipelines in the hazardous chemical production enterprise, so as to analyze a damage or leakage problem in time, monitor operation status thereof in real time, and warn and report in a timely manner. Through the temperature identification technology of the infrared imaging, the industrial infrared camera firstly identifies and marks a position of the pipeline, and then analyzes the temperature at each point of the transportation pipeline. By comparing with a preset high temperature threshold and a preset low temperature threshold, when the pipeline temperature is higher than an early warning high temperature threshold configured by the risk strategy, a pipeline high temperature alarm is issued; and when the pipeline temperature is lower than the low temperature threshold configured by the risk strategy, a low temperature warning is issued, which would trigger a risk processing action such as: page warning and timely reporting, notifying relevant supervisors through SMS, calling a fire alarm telephone.

In an embodiment of the present invention, the data layer communicates with the data collection device of the collection layer through a data layer server, comprising the following steps:

The collection device generates a public-private key pair; the TEE of the collection device stores the private key, and the TEE ensures the absolute security of the private key so that the private key would not be cracked and stolen, and ensures the uniqueness and credibility of the private key. The private key is used to encrypt the collected data; a server of the data layer stores the public key, binds it with the unique information of the collection device and synchronizes the data information collected by the collection device to the blockchain, and ensures that the data ciphertext sent by the collection device cannot be forged through asymmetric encryption;

After the data collection device is powered on or started, it obtains a timestamp of the latest block on the blockchain and the unique information of the data collection device from the server of the data layer, and calibrates local time according to the timestamp to ensure that the time of the server is consistent with that of the collection device so as to ensure the reliability of the order of subsequent data generation;

The data collection device stores a data record for each collection data, power on and off data, power data and operation record generated during its use, and generates a local timestamp and data operation sequence number for the data record, and the sequence number is incremented to ensure that the ciphertext cannot be copied and to avoid unnecessary errors caused by consecutively receiving two pieces of identical data;

The data collection device generates a corresponding data hash value according to the data record, timestamp and operation sequence number;

The data collection device signs the data hash value with the private key in the TEE;

The data collection device sends the data hash value, public key and signature to the server of the data layer, and the server of the data layer verifies the public key, signature from the data collection device and the serial number of the data collection device. Only the data signed by the private key of the corresponding device can be decrypted correctly, which produces data that can be interpreted and analyzed by the data layer. After passing the verification, the server of the data layer stores the data record, operation serial number, timestamp, public key and signature on the blockchain, and the server of the data layer records the last operation serial number which is successful uploaded by the device.

In an embodiment of the present invention, the communication between the collection layer and the data layer comprises the following steps:

uniformly distributing a key for the collection device in the TEE is by a key management system of the data layer;

binding a serial number of the collection device to a dispersion factor by the key management system, and dispersing the dispersion factor and a root key to obtain a device communication key of the collection device, so as to achieve the effect of one machine one key, and prevent keys of all devices from being cracked after a certain device has been cracked to improve the reliability of the devices, wherein the dispersion factor includes the serial number of the collection device, or other unique device information, such as a Mac address, a chip serial number, and a system unique identification code uniformly allocated by the system;

performing two-way identity authentication before the collection device uploads the data to the data layer, wherein in one aspect, the data layer authenticates the collection device to ensure that the devices that successfully uploaded the data are all authenticated devices, and the data uploaded by the unauthenticated devices is directly filtered, so as to effectively prevent the data layer from being maliciously attacked and ensure the validity of the data source; and in another aspect, the collection device authenticate the data layer to ensure that the data from the collection device is uploaded to a credible system, so as to avoid other forgery systems from understanding the basic data of the production enterprise, which has adverse consequences for the production enterprise;

wherein the collection device generates a first random number through TEE, sends the first random number and the serial number of the device to the data layer, and waits for the data layer to return an encryption result for authentication in the data layer;

querying the key management system to obtain the corresponding dispersion factor after the first random number and serial number from the collection device are received by the data layer, utilizing the dispersion factor to disperse a root key to obtain a communication key of the collection device, and then utilizing the communication key to encrypt the received first random number so as to obtain a first encryption result, generating a second random number at the same time, and sending the first encryption result and the second random number to the collection device;

after the first encryption result and the second random number are received by the collection device, firstly decrypting the first encryption result in the TEE, and comparing the first encryption result with the first random number, ending the authentication if the first encryption result is the same as the first random number, continuing to encrypt the second random number with the TEE so as to obtain a second encryption result if the first encryption result is not the same as the first random number, returning the second encryption result to the data layer, decrypting the second encryption result by the data layer with the previously generated device communication key, and comparing a decryption result with the second random number, and considering the device to be credible and accepting the data from the data collection device if the decryption result is the same as the second random number;

during the operating process, forming a data packet with the collected data and the serial number of the device by the data collection device, encrypting the data packet with a key in the TEE to form a ciphertext data packet, and uploading the ciphertext data packet as well as plaintext information of the serial number of the device to the data layer, wherein the use of the ciphertext data packet is to prevent the data from being intercepted by criminals to analyze the basic situation of the production enterprise during the transmission, thereby causing adverse effects on the production enterprise;

using the key management system by the data layer to disperse the received serial number with the corresponding dispersion factor to obtain the communication key, and using the key to decrypt the ciphertext data packet to verify whether the serial number therein is consistent, and displaying the data is in the data layer and then uploading the data to the blockchain through the data layer if the serial number therein is consistent.

The above description is a specific example of the present invention, and does not constitute any limitation to the present invention. Obviously, for a person skilled in the art, after understanding the content and principles of the present invention, various modifications and changes in form and details may be made without departing from the principles and structures of the present invention, but these modifications and changes based on the inventive concept of the present invention still fall within the protection scope of the claims of the present invention.

The invention claimed is:

1. A blockchain-based supervision system of hazardous chemical production, wherein the system comprises:
    a collection layer, configured to collect production data information in a production process of a production enterprise, wherein a collection device in the collection layer sets a TEE (trusted execution environment) to encrypt or hash the collected production data information;
    a data layer, configured to uplink a hash certificate of the production data information collected by the collection layer to a chain through an alliance chain, wherein the collection layer communicates with the data layer;
    a blockchain, configured to deploy a file uplink contract, and at the same time, encrypt and store a file on a privacy computing server after the file is connected to the trusted environment;
    a privacy computing system, that is programmed to form a metadata market of the data from file description information uplinked and record the metadata information of the collected data, wherein a data user applies for the right of use to a production enterprise that produces the data, and after obtaining authorization, the data user performs various applications on the privacy computing system;
    and wherein the communication between the collection layer and the data layer comprises the following steps:
        uniformly distributing a key for the collection device in the TEE is by a key management system of the data layer;
        binding a serial number of the collection device to a dispersion factor by the key management system, and dispersing the dispersion factor and a root key to obtain a device communication key of the collection device;
        performing two-way identity authentication before the collection device uploads the data to the data layer, wherein the collection device generates a first random number through TEE, sends the first random number and the serial number of the device to the data layer, and waits for the data layer to return an encryption result for authentication in the data layer;
        querying the key management system to obtain the corresponding dispersion factor after the first random number and serial number from the collection device are received by the data layer, utilizing the dispersion factor to disperse a root key to obtain a communication key of the collection device, and then utilizing the communication key to encrypt the received first random number so as to obtain a first encryption result, generating a second random number at the same time, and sending the first encryption result and the second random number to the collection device;
        after the first encryption result and the second random number are received by the collection device, firstly decrypting the first encryption result in the TEE, and comparing the first encryption result with the first random number, ending the authentication if the first encryption result is the same as the first random number, continuing to encrypt the second random number with the TEE so as to obtain a second encryption result if the first encryption result is not the same as the first random number, returning the second encryption result to the data layer, decrypting the second encryption result by the data layer with the previously generated device communication key, and comparing a decryption result with the second random number, and considering the device to be credible and accepting the data from the data collection device if the decryption result is the same as the second random number;
        during the operating process, forming a data packet with the collected data and the serial number of the device by the data collection device, encrypting the data packet with a key in the TEE to form a ciphertext data packet, and uploading the ciphertext data packet as well as plaintext information of the serial number of the device to the data layer;
        using the key management system by the data layer to disperse the received serial number with the corresponding dispersion factor to obtain the communication key, and using the key to decrypt the ciphertext data packet to verify whether the serial number therein is consistent, and displaying the data is in the data layer and then uploading the data to the blockchain through the data layer if the serial number therein is consistent.

2. The blockchain-based supervision system of hazardous chemical production as claimed in claim 1, wherein the privacy computing system adopts the TEE (trusted execution environment) technology; the data user writes an execution logic used by the data through a scripting language, and encrypts the scripting language and sends the scripting language to the trusted execution environment; after the script is received by the TEE, decryption is performed on the script; and after the decryption, the TEE executes the script through a built-in script interpreter; and, after the script is executed, the data user obtains the execution result.

3. The blockchain-based supervision system of hazardous chemical production as claimed in claim 1, wherein the production data collected by the collection device includes unlocking operation information.

4. The blockchain-based supervision system of hazardous chemical production as claimed in claim 3, wherein the unlocking operation information is double double-locking operation information, and a warehouse door of a hazardous chemical production enterprise is set to have two people present at the same time, and only the warehouse door opens after the identity information of the two people is verified; and the data information of the device is to record who opens the door of the hazardous chemicals warehouse and the time when the door opens.

5. The blockchain-based supervision system of hazardous chemical production as claimed in claim 1, wherein the production data collected by the collection device includes data information of an electronic scale, the data information of the electronic scale includes: when items in the warehouse of the production enterprise are taken with the electronic scale used for weighing, the data information of the device is to record who takes the items, which items are taken, the weight of the items, and the time when the items are taken.

6. The blockchain-based supervision system of hazardous chemical production as claimed in claim 1, wherein, the production data collected by the collection device includes operation data of an inspection box.

7. The blockchain-based supervision system of hazardous chemical production as claimed in claim 1, wherein the production data collected by the collection device includes data of a trajectory tracker, if the item to be taken is a hazardous chemical, the data of the trajectory tracker is data recorded by the trajectory tracker after the item is taken, the data indicating a place where the item is taken to from the warehouse.

8. The blockchain-based supervision system of hazardous chemical production as claimed in claim 1, wherein the production data collected by the collection device includes a temperature of hazardous chemicals, inflammables and explosives, and a surrounding temperature, so as to monitor an existing risk in real time, early warn and report the risks in a timely manner.

9. The blockchain-based supervision system of hazardous chemical production as claimed in claim 1, wherein the production data collected by the collection device includes a hydraulic pressure of a storage pipe of the hazardous chemicals, and the value thereof and a changing trend are monitored in real time, so as to early warn and report in a timely manner.

10. The blockchain-based supervision system of hazardous chemical production as claimed in claim 1, wherein the production data collected by the collection device includes infrared images of transportation pipelines in the hazardous chemical production enterprise, so as to analyze a damage or leakage problem in time, monitor operation status thereof in real time, and early warn and report in a timely manner.

* * * * *